March 6, 1951          H. E. ALTGELT          2,544,411
COMB TYPE COTTON HARVESTER Filed Feb. 4, 1946          4 Sheets-Sheet 1

INVENTOR.
Herman E. Altgelt,
BY John P. Smith
Atty.

March 6, 1951 — H. E. ALTGELT — 2,544,411
COMB TYPE COTTON HARVESTER
Filed Feb. 4, 1946 — 4 Sheets-Sheet 3

INVENTOR.
Herman F. Altgelt,
BY John P. Smith
Atty.

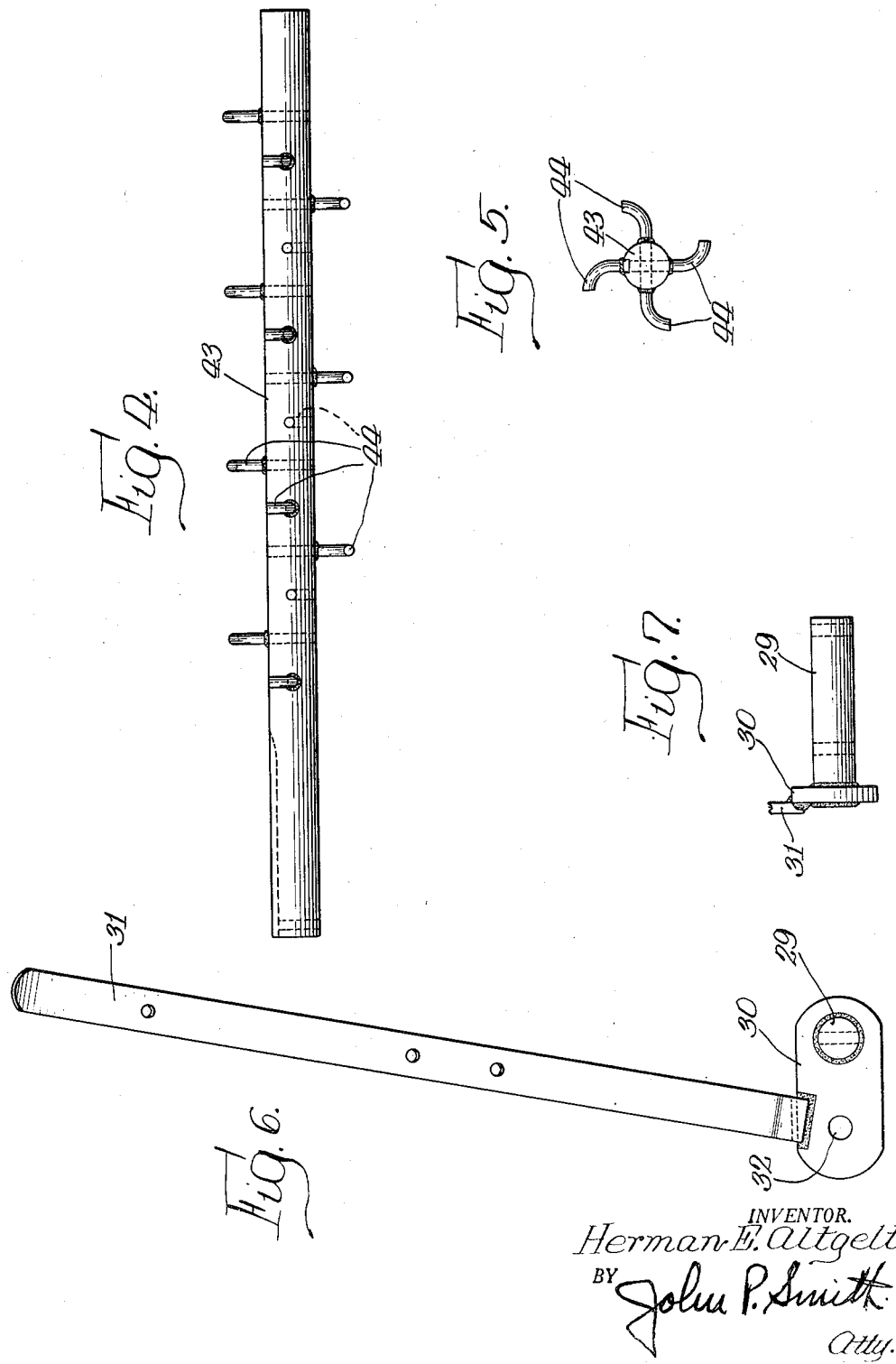

Patented Mar. 6, 1951

2,544,411

UNITED STATES PATENT OFFICE 2,544,411

COMB TYPE COTTON HARVESTER

Herman E. Altgelt, South Bend, Ind., assignor to
The Oliver Corporation, a corporation of Delaware Application February 4, 1946, Serial No. 645,323

10 Claims. (Cl. 56—30)

The present invention relates generally to a cotton harvester, but more particularly to novel and improved features of construction and operation of a cotton picker of the stripper type.

One of the objects of the present invention is to provide a novel and improved cotton harvester of the stripper type having power driven and power lift means whereby the front end of the harvester and the forward individually adjustable supporting wheels may be raised from the ground for transport purposes.

A further object of the invention is to provide a novel and improved cotton harvester having a novel stripping mechanism involving a series of longitudinally projecting tines in combination with a revolving tine stripper and cleaning mechanism provided with a series of teeth adapted to revolve between the adjacent tines.

A further object of the invention is to provide a novel and improved construction of cotton harvester in which two gathering hoods embrace two adjacent rows of cotton with certain of the walls arranged adjacent the forward stripper reels in such a manner as to deflect into the hood, certain of the cotton lint which would ordinarily be thrown beyond the reach of the gathering means.

A still further object of the invention is to provide a novel and improved construction of a two row cotton harvester in the form of two separate and longitudinally extending housings provided with blower fans and conduits adjacent their rear ends so that the discharge ends of each of the conduits converge into a single conduit from which the cotton lint is discharged into a trailer or farm wagon attached by a wagon hitch to the cotton harvester.

These and other objects are accomplished by providing a construction and an arrangement of the various parts in the manner hereinafter described and particularly pointed out in the appended claims.

Referring to the drawings:

Fig. 4 is a top plan view of the stripper cleaner shaft;

Fig. 5 is an end elevational view of the cleaner shaft shown in Fig. 4;

Fig. 6 is a detailed side elevational view of the lever and wheel support for each of the adjustable front wheels; and Fig. 7 is a fragmentary side elevational view of the front wheel bearing shown in Fig. 6.

Figure 1:
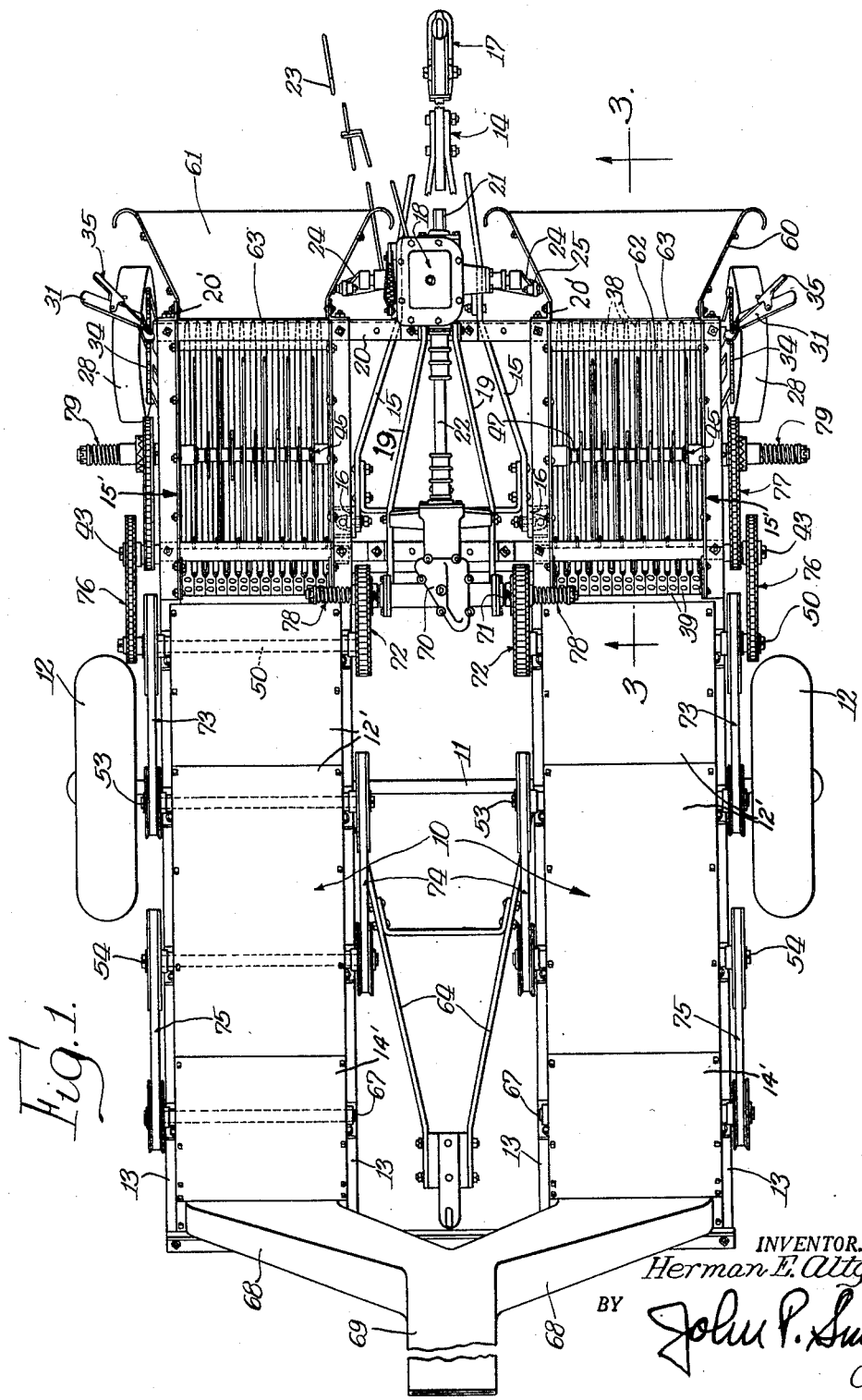
Fig. 1 is a top plan view of my improved two row cotton harvester.

In illustrating one form my improved two row cotton stripper harvester may assume in practice, I have shown the same as comprising two laterally spaced apart and longitudinally extending and upwardly inclined elevating housings generally indicated by the reference character 10. These housings are generally rectangular in cross section and are provided with the same identical strippings, conveying, revolving stripper cleaners and blowers so that the description of one will suffice for that of the other. These housing members 10 are provided with a suitable frame structure which is supported on a main bearing shaft or axle 11. Journaled on the outer ends of the axle are supporting wheels 12. Each of these housings 10 are supported in position by two spaced apart longitudinally extending and rearwardly and upwardly inclined main frame angle members 13 carried by the axle 11 by plates 13'. The upwardly inclined housings 10 include vertical side wall sections 11', top sections 12' and curved rear ends 14'. The side wall sections 11' are secured to the frame members 13. The top sections 12' and 14' are secured to the adjacent side sections 11'. Secured to the forward ends of each of the housings 10 are gathering hoods, generally indicated by the reference character 15', the details of which will hereinafter be more fully described. The cotton harvester is drawn by a tractor through the medium of a hitch or tongue generally indicated by the reference character 14, which includes two rearwardly diverging bars 15 which have their rear ends pivoted to brackets 16. The brackets 16 are secured to the inner main frame members 13. The forward end of the draft member 14 is provided with the usual draft clevis, generally indicated by the reference character 17. Located in the longitudinal center and between and above the forward ends of the housings 10 is a transmission and power lift mechanism, located within the housing, generally indicated by the reference character 18. The transmission and power lift mechanism mounted within the housing 18 is identically like the construction disclosed in the Herman E. Altgelt Patent No. 2,081,346, granted May 28, 1937, on Power Lift and Power Driven Potato Digger and a more detailed description of the construction and operation of this mechanism may be had by referrence to this patent. This power transmission and lift mechanism is supported in the position shown in Figs. 1 and 2 of the drawings by a suitable frame structure which includes longitudinally extending supplemental frame members 19 which have their forward ends secured to a transverse angle member 20. The angle member 20 is supported in position by four spaced apart angle members 20'. This transmission mechanism may be connected to the power takeoff shaft of the tractor by suitable connections to a forward end 21 of a main transmission shaft 22. The power lift mechanism within the housing 18 consists of the conventional half revolution clutch and is provided with the usual trip rod control indicated at 23 which extends within easy reach of the operator's seat on the tractor. The half revolution clutch mechanism is provided with the usual two oppositely disposed cranks 24 which have their free ends pivotally connected with depending links 25. The lower ends of the links 25 are provided with vertical slots 26 which slidably engage studs or bolts 27 secured to the tongue frame members 15. Obviously, upon the actuation of the trip rod 23, the cranks 24 of the half revolution clutch member are actuated through an angular magnitude of one hundred eighty degrees to elevate or raise the forward end of the two row cotton picker so as to cause the same to pivot about the rear axle 11 and wheels 12 of the harvester. The forward gathering shields on each of the cotton row housings 10 may be adjusted with respect to the ground by individually adjustable forward carrying wheels 28. These carrying wheels 28 are journaled on studs 29 which project laterally or outwardly from crank arms 30 which, in turn, are rigidly secured to upwardly extending levers 31. See Figs. 6 and 7 of the drawings. These levers in turn are pivoted, as shown at 32, to depending brackets 33 secured to the side frame or main members 13. Each of the levers 31 is provided with a locking sector 34, which, in turn, are secured to the outside angle members 13. The levers 31 are also provided with the usual detent locking mechanism, generally indicated by the reference character 35, for locking these levers in various positions of adjustment.

Obviously from the above description, it will be understood that when the operator desires to transport the cotton harvester and permit the same to trail on the turn of the tractor, the forward wheels 28 may be lifted from the ground with the forward end of the harvester, by tripping the trip rod 23 which will cause the opposite cranks 24 to revolve through an angular magnitude of one hundred eighty degrees, thereby depressing the links 25 and raising the front end of the harvester with respect to the draft member 14 so that the harvester as a whole is tilted rearwardly about the rear axle 11. In order to lower the front end of the harvester from elevated position, the trip rod is again actuated and the machine returned to operative position. If it is desired to adjust the front end of the machine, so as to properly position the gathering shields with respect to either row of cotton plants, either lever 31 and associated wheel 28 may be adjusted to secure the proper positioning of the front end with respect to the ground.

Figure 3:
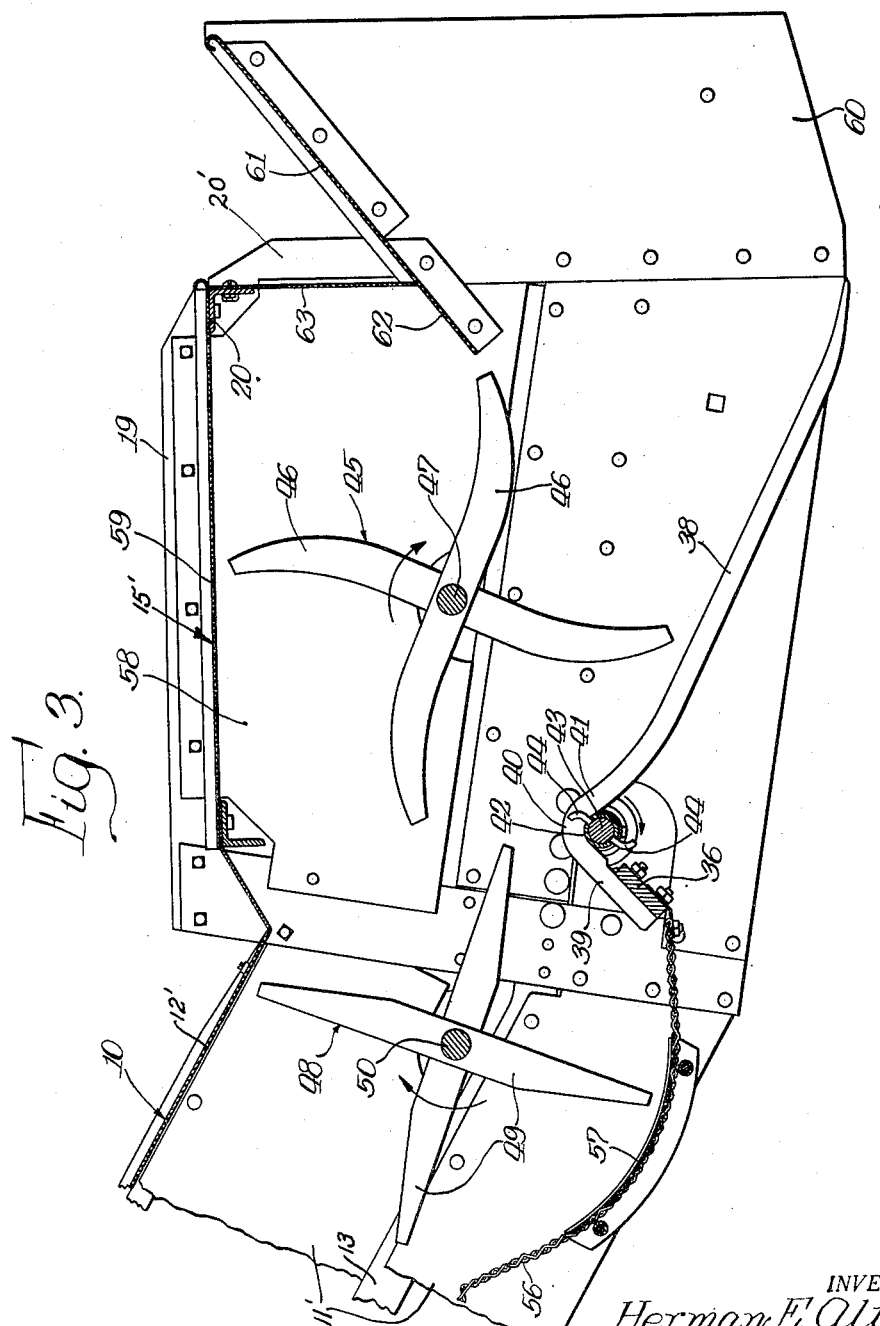
Fig. 3 is an enlarged fragmentary cross sectional view taken on the line 3—3 in Fig. 1.

Another essential feature of the present invention involves a novel construction and positioning of a plurality of stripper tines for stripping the cotton bolls from the cotton plants and a novel cotton stripper cleaning shaft which eliminates and prevents clogging of the cotton lint clinging to the tines and aids in the efficient delivery of the cotton lint to the next adjacent carder or reel. This mechanism includes a transverse flat bar 36 which is located in a rearwardly inclined position between the vertical walls of each of the housing members 10. The bar 36 has its opposite ends rigidly secured to brackets 37 secured to the opposite main frame or angle members 13. Secured to the top surface of each of these transverse bars 36 are a plurality of longitudinally and downwardly extending tines 38. The rearward ends of these tines are flattened, as shown at 39, so that their contiguous edges lie in contact with the next adjacent one throughout the width of each of these housings, as clearly shown in Figs. 1 and 3 of the drawings. From a point adjacent the flattened portion 39 of these tines 38, the tines project upwardly and forwardly at substantially forty-five degrees and thence curve downwardly into substantially a quarter turn as shown at 40 so that the portion indicated at 41 is substantially at right angles with respect to the portion 39 of each of the tines. In this connection it will also be noted that the curvature of each of the tines, as shown at 42, contacts the periphery of a cotton stripper cleaning shaft 43. The shaft 43 has its opposite ends mounted in suitable bearings (not shown) which in turn, are secured to the opposite main frame members 13.

Figure 2:
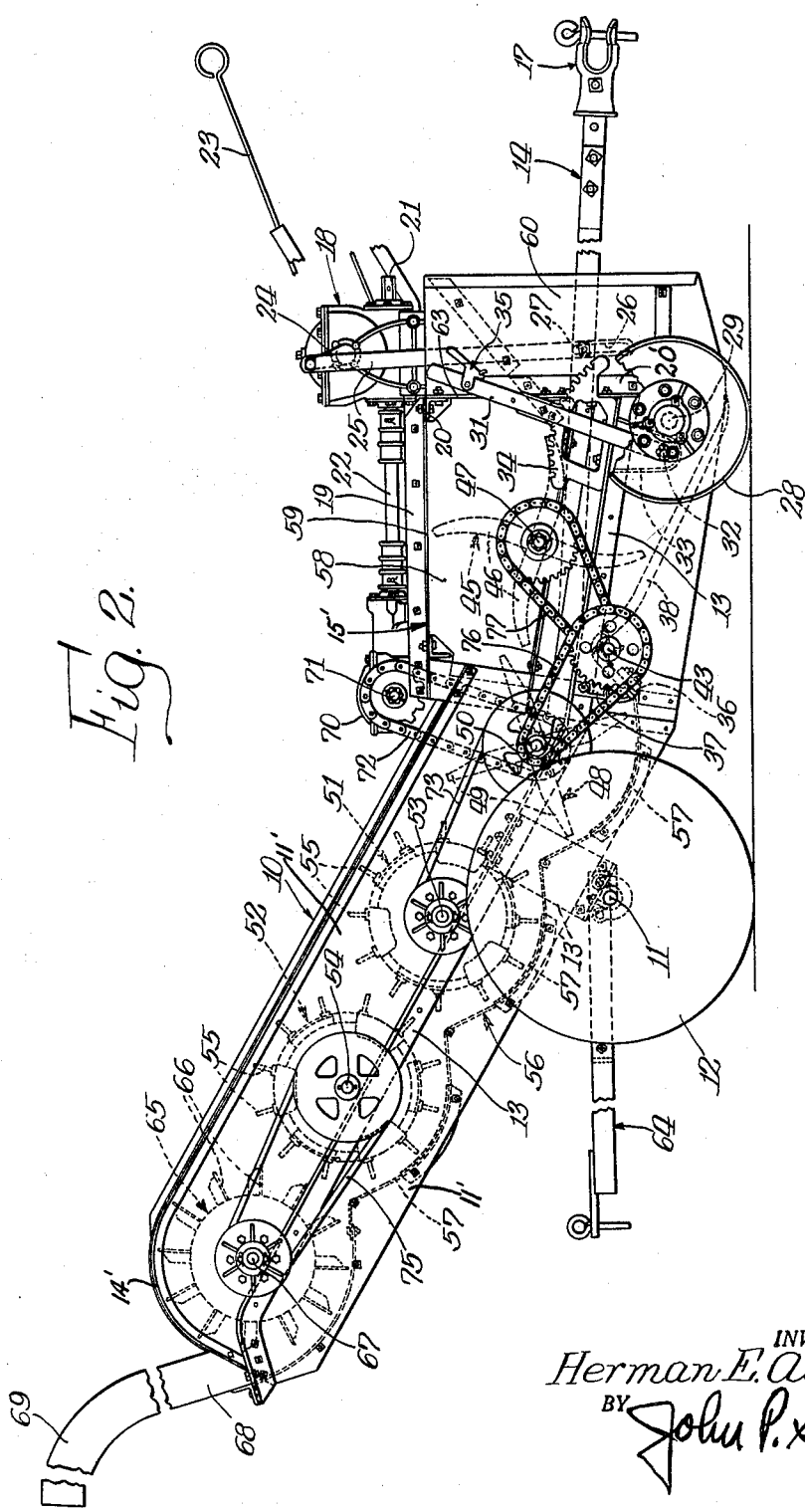
Fig. 2 is a side elevational view of the same.

From the above description and an examination of Fig. 1 of the drawings, it will be seen that from a point adjacent the forward edge of the transverse bar 36 to the forward ends of the stripper tines 31, these tines are uniformly spaced apart so as to perform a combing or stripping action upon the plant to thereby strip the bolls therefrom. In order to prevent cotton lint from wedging or accumulating at a point at the juncture of the forward edge of the bar and between the adjacent tines, the shaft 43 is provided with a plurality of spaced apart curved prongs 44 which are arranged so that the adjacent curved prongs are at right angles with the next adjacent prongs as clearly shown in Figs. 4 and 5 of the drawings. The stripper cleaner shaft 43 is adapted to rotate in a direction indicated by the arrow in Fig. 3 of the drawings and the prongs 44 thereof are so spaced as to revolve throughout and substantially occupy the space between the intervening tines and thereby prevent clogging of the cotton lint on the tines adjacent the bar 36.

From the above description it will be readily seen that by positioning the rear ends of the tines at right angles to an intermediate portion thereof and positioning a stripper cleaner shaft and prongs thereof to rotate at a point above the forward edge of the bar 36 effective means is provided to strip the intervening space between the tines. This construction therefore provides a very efficient arrangement which eliminates accumulation and clogging at this point in the stripper mechanism.

Another very important feature of my invention embodies an arrangement and construction of the gathering shield or hood of each of the housings 10 which prevents the accidental discharge of cotton lint which would normally be lost by the forward motion of the top portion of the front reels carrying over a certain portion of the lint in its revolving action. The cotton harvester in this instance is provided with a forward reel generally indicated by the reference character 45 which is mounted in the gathering housing 15' and consists of a plurality of substantially S-shaped blades, which in turn, are secured to a shaft 47, with each adjacent blade arranged at right angles with the next adjacent one. The periphery of the blades 46 of the reel 45 is adapted to rotate in a path in close proximity to the flat portion 41 and curved portion 40 of the tines 38. Mounted within the front end of each of the housings 10 and located rearwardly with respect to the first reel 45 is a carder reel, generally indicated by the reference character 48. This carder reel 48 consists of a plurality of blunt pointed blades 49 in which each blade is arranged at right angles with respect to its next adjacent blade. All the blades are secured to a revolving shaft 50. The periphery of these blades 49 are positioned to rotate substantially tangentially to the flat portions 39 of the tines 38. Positioned rearwardly of each of the carder reels 48 in each of the longitudinally extending housing members 10 are successive carder drums generally indicated by the reference characters 51 and 52. These carder drums 51 and 52 are provided with a plurality of radially projecting prongs or fingers 55. Forming the floor or bottom of each of the housing members 10 and cooperating with the carder drums 51 and 52 as well as the carder reel 48 for crushing and partly opening the cotton bolls and for breaking up the twigs that enter with the lint and seed, is a coarse woven wire mesh floor, generally indicated by the reference character 56. This wire mesh floor 56 is arcuately curved at intervals throughout its longitudinal length as shown at 57 so as to lie in a position slightly spaced from the periphery of the blades or prongs of each of the carders 48, 51 and 52. See Fig. 2 of the drawings. Each of the gathering hoods 15' are provided with oppositely disposed vertical side walls 58 throughout their length and an enclosed top as shown at 59. The forward end of each of the hoods 15' have forwardly and vertically extending diverging gathering shields 60. The top of these shields have rearwardly inclined sheet iron tops 61. These diverging shields 60 and top 61 guide and compress the cotton plants as the stripper tines 38 penetrate the lower portion thereof in the travel of the cotton harvester over two adjacent rows. The inner ends of each of the top shields 61 project inwardly as shown at 62, at an angle of substantially forty-five degrees and to a point adjacent the periphery of the blades 46 of the revolving reel 45. (See Fig. 3 of the drawings.) Positioned forwardly of the inner end of and above the inclined surface or deflector 62 of the top shield 61 is a vertical wall or baffle 63 which extends across each of the hoods 15' at the forward end thereof. These baffles 63 and deflectors 62 are so positioned that when cotton lint is carried over by the forward motion of the top of the revolving wheel 45, it will strike the vertical shield or deflector 63 and be directed by the downwardly and rearwardly inclined deflector 62 into the path of the incoming cotton plant and thereby eliminate any loss of cotton lint which would be normally occasioned by the revolving action of the reel 45.

Another important feature of the present invention includes a novel blower or cotton elevating mechanism for conveying the lint from each of the rear ends of the housings to a trailer or farm wagon which may be connected by a draft hitch generally indicated by the reference character 64. This hitch 64 has its forward end pivotally connected to the rear or main axle 11 as clearly shown in Figs. 1 and 2 of the drawings. This blowing mechanism includes a revolving drum-like fan, generally indicated by the reference character 65 mounted within and adjacent the rear ends of each of the housings 10. This fan comprises a plurality of radially projecting flat blades 66 of a length substantially the width between the vertical walls 11' of each housing. These fans are mounted on suitable shafts 67, which in turn, are journaled in suitable bearings secured to the opposite main or angle frame member 13 of the main frame. The discharge or delivery ends of each of the housings 10 are connected by rearwardly converging conduits 68 which converge into a single longitudinally and rearwardly extending conduit 69 for discharging the cotton lint into the trailer or wagon attached to the hitch 64.

The movable elements which includes carder reels, drum and fan of each of the housing members 10 and 15' are rotatably driven from the power takeoff of the tractor through the main transmission shaft 22 through the medium of bevelled gears mounted within the transmission housing 70. The transmission mechanism within the housing 70 operatively drives a transverse main drive shaft 71 which in turn, through suitable gearing mechanisms, connected to the opposite ends thereof, as shown at 72, operatively drive the shafts 50 of each of the reels 48. The shaft 50 in each instance is geared to the shaft 53 of the carder drum 51 by a belt pulley drive connection generally indicated at 73. The shaft 53 in each case operatively drives the shaft 54 by a belt and pulley drive generally indicated by the reference character 74. Each of the shafts 54 operatively drive the respective fan shafts 67 by a belt and pulley drive mechanism generally indicated by the reference character 75. Each of the shafts 50 of the respective revolving reels 48 are geared by means of sprocket wheels and chain drive, generally indicated at 76, to operatively drive the stripper cleaning shaft 43. Each of the stripper cleaner shafts 43 are, in turn, operatively geared by means of sprocket wheel and drive chain generally indicated by the reference character 77 to drive the shaft 47 of the revolving reel 45. Suitable spring control clutches as generally indicated at 78 and 79 are provided for the main transmission shaft 71 and reel shaft 47 respectively, so as to prevent breakage in the event the operating parts are overstrained or the machine is clogged for any reason.

Summarizing the advantages and function of operation of my improved cotton harvester, it will be readily seen that by pivotally connecting the draft member 14 to the harvester and attaching the forward end thereof to the drawbar of the tractor, the power lift mechanism mounted on the harvester and operatively driven from the power takeoff of the tractor may be actuated by manipulating the trip rod 23 to raise the front end of the harvester so that the front end of the harvester and carrying wheels 28 are raised out of engagement with the ground for transport purposes. However, when the harvester is in operative position, the non-castering supporting front wheels 28 may be adjusted individually by adjusting the levers 31 to regulate the position of the gathering shields 60 with respect to the ground. It will also be noted that by positioning the baffle walls 63 and deflectors 62 in a position in advance of the revolving reels 45, any cotton lint which may be carried over by these reels are deflected back into the path of travel so as to eliminate any loss of cotton which might otherwise have occurred. It will further be noted that the construction and arrangement, as well as the positioning of the stripper tines 38 partly embracing and lying in contiguous position with respect to the cotton stripper cleaning shaft 43 with its curved projecting prongs revolving in a direction to comb the space between the adjacent tines, the possibility of clogging or choking at this point is completely eliminated. It will also be observed that by positioning blower fans at the rear or delivery ends of each of the housings and providing converging delivery conduits from the discharge openings in each of the housings to a single conduit, a very simple and efficient construction is afforded for delivering the picked cotton to a trailer or wagon attached to the harvester.

While in the above description I have disclosed one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. The combination with a cotton harvester having a main frame, a longitudinally extending housing mounted on said main frame, diverging gathering shields projecting forwardly from said housing, a transverse rearwardly inclined bar secured to said housing, a plurality of longitudinally extending and laterally spaced apart tines secured to the top surface of said bar having their rear ends flattened and lying contiguously across said bar, the intermediate portions of said tines being bent substantially at right angles to the flattened portions thereof, a rotary stripper cleaner shaft positioned above the flattened portions of said tines, and curved radially projecting prongs carried by said shaft and adapted to revolve and project outwardly between the adjacent bent portion of the tines for preventing the accumulation of lint thereon.

2. The combination with a cotton harvester having a main frame, a longitudinally extending housing mounted on said main frame, diverging gathering shields projecting forwardly from said housing, a transverse and rearwardly inclined bar secured to said housing, a plurality of longitudinally extending and laterally spaced apart stripper tines secured to the upper surface of said bar, the rear ends of said tines being flattened with the adjacent flattened portions lying in contacting relation, said tines being bent substantially at right angles at a point adjacent said flat portions, a revolving stripper cleaner shaft positioned at the junction of the bend in said tines, and outwardly curved cleaner prongs carried by said shaft and adapted to revolve in the space between the bent portions of the adjacent tines for cleaning lint therefrom.

3. The combination with a cotton harvester having a main frame, a longitudnally extending housing mounted on said main frame, diverging gathering shields projecting forwardly from said housing, a plurality of longitudinally extending and laterally spaced apart stripper tines secured to said frame and located rearwardly of said gathering shields, the rear portions of said tines bent substantially into a quarter of a circular arc, a revolving cleaner stripper shaft journaled below and contacting the curved portions of said tines, and curved cleaner prongs projecting from said shaft and revolving into the space between the adjacent circular arc portions of the tines for preventing the accumulation of cotton between said tines.

4. The combination with a cotton harvester having a main frame, a longitudinally extending housing mounted on said frame, diverging gathering shields projecting forwardly from said housing, a transverse and rearwardly inclined bar secured to said housing, a plurality of longitudinally extending and laterally spaced apart stripper tines secured to the upper surface of said bar, the rear ends of said tines being flattened with the adjacent flattened portions lying in contacting relation, said tines being bent substantially at right angles at a point adjacent said flat portions, a revolving stripper cleaner shaft positioned at a junction of the bend on said tines, curved cleaner prongs carried by said shaft and adapted to revolve in the space between the bent portions of said tines for cleaning lint therefrom, and a rotary stripper reel positioned over said tines and adjacent said cleaner shaft.

5. The combination with a cotton harvester having a main frame, a housing mounted on said main frame, a revolving stripper reel mounted in said housing, a revolving carder reel mounted in said housing rearwardly of said first named reel, a plurality of laterally spaced apart tines mounted in said housing extending downwardly and forwardly in a position substantially tangent to the periphery of said first named reel, the rear end portions of said tines being bent downwardly and rearwardly with respect to the main portions thereof so as to occupy a plane tangent to the periphery of said second named reel, a revolving cleaner shaft positioned below and at the bend in said tines, and curved cleaner prongs projecting from said shaft and movable into the space between and at the bend in said tines for cleaning cotton lint therefrom.

6. The combination with a cotton harvester having a main frame, a housing mounted on said main frame, a revolving stripper reel mounted in said housing, a revolving carder reel mounted in said housing rearwardly of said first named reel, a plurality of laterally spaced apart tines mounted in said housing extending downwardly and forwardly in a position substantially tangent to the periphery of said first named reel, the rear end portions of said tines being bent downwardly and rearwardly with respect to the main portions thereof so as to occupy a plane tangent to the periphery of said second named reel, a revolving cleaner shaft journaled in said housing having its periphery engaging the curvature of the bend in said tines, and curved cleaner prongs projecting from said shaft and revolvable in the space between the bend in said tines for cleaning the cotton lint therefrom.

7. The combination with a cotton harvester having a main frame, a longitudinally extending housing mounted on said main frame, diverging gathering shields projecting forwardly from said housing, a transverse member secured to said housing, a plurality of forwardly and downwardly inclined and laterally spaced apart tines secured to said member, the rear portions of said tines being bent at right angles with respect to the forward portions, said rear portions of the tines being flattened and lying in successive contiguous alignment, a rotary stripper cleaner shaft engaging the lower surface of said tines at a point above said flattened portions thereof, and curved cleaner prongs carried by said shaft and adapted to revolve in the space between the adjacent bends in the tines for cleaning the cotton lint therefrom.

8. A two row cotton harvester comprising a main frame, two longitudinally extending housings mounted on said main frame, cotton stripping means mounted on the forward end of each of said housings, cotton carder reels and conveying means mounted in each of said housings, blower fans mounted in the rear portion of each of said housings, and rearwardly converging conduits from the rear end of said housings and communicating with a single delivery conduit at the rear end thereof.

9. A two row cotton harvester comprising a main frame, two longitudinally extending housings mounted on said main frame, cotton stripping means mounted on the forward end of each of said housings, stripper reels positioned in said housings over said stripping means, a series of revolving carder cylinders mounted in said housings, blower fans positioned at the delivery ends of said housings, and a Y-shaped delivery conduit forming the connections with each of the rear ends of said housings to a single delivery spout at the rear end thereof.

10. A two row cotton harvester comprising a main frame, two longitudinally extending housings mounted on said main frame, cotton stripping means mounted on the forward end of each of said housings, stripper reels positioned in said housings over said stripping means, a series of revolving carder cylinders mounted in said housings, blower fans positioned at the delivery ends of said housings, rearwardly converging conduits extending from the periphery of each of said fans and respective housings, and a single delivery conduit communicating with said converging conduits for discharging the cotton from the rear of said harvester.

HERMAN E. ALTGELT.

REFERENCES CITED

The following references are of record in the file of this patent:

UNITED STATES PATENTS

| Number | Name | Date |
|---|---|---|
| 1,059,270 | Brown | Apr. 15, 1913 |
| 1,789,803 | Boone | Jan. 20, 1931 |
| 1,842,737 | Tharp | Jan. 26, 1932 |
| 1,894,198 | Rust et al. | Jan. 10, 1933 |
| 2,004,713 | Thomann | June 11, 1935 |
| 2,062,351 | Court | Dec. 1, 1936 |
| 2,081,346 | Altgelt | May 28, 1937 |